United States Patent
Muddiman et al.

(10) Patent No.: US 6,220,269 B1
(45) Date of Patent: Apr. 24, 2001

(54) BURSTING DISC ASSEMBLY RETAINING RING WITH A CLOVER LEAF CUTTING PATTERN AND PROJECTION

(75) Inventors: G. Scott Muddiman; John D. Goddard, both of Burlington (CA)

(73) Assignee: Process Equipment Inc., Burlington (CA)

( * ) Notice: Subject to any disclaimer, the term of this patent is extended or adjusted under 35 U.S.C. 154(b) by 0 days.

(21) Appl. No.: 09/475,182

(22) Filed: Dec. 30, 1999

(51) Int. Cl.[7] .................................................. F16K 17/40
(52) U.S. Cl. ..................... 137/68.29; 137/68.26; 220/89.3
(58) Field of Search ............................ 137/68.29, 68.26; 220/89.3

(56) References Cited

U.S. PATENT DOCUMENTS

| | | |
|---|---|---|
| 3,704,801 | 12/1972 | Lidgard . |
| 4,119,236 | 10/1978 | Shaw et al. . |
| 4,211,334 * | 7/1980 | Witten et al. ........................ 220/89.3 |
| 4,236,648 | 12/1980 | Wood et al. . |
| 4,269,214 * | 5/1981 | Forsythe et al. .............. 137/68.29 X |
| 4,278,181 * | 7/1981 | Wood et al. ......................... 220/89.3 |
| 4,301,938 * | 11/1981 | Wood et al. ......................... 220/89.3 |
| 4,342,988 | 8/1982 | Thompson et al. . |
| 4,479,587 * | 10/1984 | Mundt et al. .................. 137/68.29 X |
| 4,580,691 | 4/1986 | Hansen . |
| 4,669,626 | 6/1987 | Mozley . |
| 4,682,619 * | 7/1987 | Clift et al. ..................... 137/68.29 X |
| 4,691,729 * | 9/1987 | Clift .............................. 137/68.29 X |
| 4,759,460 | 7/1988 | Mozley . |
| 4,795,051 | 1/1989 | Ou . |
| 5,002,088 | 3/1991 | Engelhardt et al. . |
| 5,082,133 * | 1/1992 | Farwell et al. ................. 137/68.29 X |

FOREIGN PATENT DOCUMENTS

| | | |
|---|---|---|
| 1054022 | 5/1979 | (CA) . |
| 1244315 | 7/1984 | (CA) . |
| 2001315 | 10/1989 | (CA) . |
| 2128492 | 7/1994 | (CA) . |
| 2205174 | 6/1995 | (CA) . |

\* cited by examiner

*Primary Examiner*—John Rivell
(74) *Attorney, Agent, or Firm*—Ian Fincham

(57) ABSTRACT

In combination with a rupture disc assembly, there is provided an improvement by using a support ring having a projection and a continuous, generally clover leaf pattern cutting edge.

28 Claims, 4 Drawing Sheets

BURSTING DISC ASSEMBLY RETAINING RING WITH A CLOVER LEAF CUTTING PATTERN AND PROJECTION

FIELD OF THE INVENTION

This invention relates to a pressure relief valve, and more particularly to a pressure relief valve being of a metal rupture disc in the form of thin rupture members having a metal liner body with a weakened portion including, in the form of a scored pattern, where the metal liner is placed in juxtaposition with a bursting disc.

BACKGROUND OF THE INVENTION

The present invention relates to safety pressure relief devices and, in particular, to rupture disc assemblies, including reverse buckling rupture discs, and also to methods of manufacturing such rupture discs and assemblies.

Rupture discs have been known in this art for many years. Normally, the rupture discs are manufactured to have a rupturable membrane to provide a safety mechanism to relieve excessive pressure within an over-pressurized system or vessel. The rupture disc and or rupture disc assemblies are typically placed within such a system or vessel so as to prevent the flow of a liquid or a gas through such a device until the rupture disc ruptures through excessive or over-pressure loads. Typically, rupture discs have a score pattern formed by cuts, machined or by other conventional methods into the dome portion of the disc to enable the disc to buckle and to burst when under excessive pressure.

Rupture discs having support rings providing cutting projections have been used, but are restricted in use, being capable of use with gases only and sometimes restricted in pressure range.

Obviously, if a rupture disc assembly could be developed which had better operating characteristics, including the ability to be used within a gas and or liquid environment capable of low and or high burst pressures, all without reducing the economic viability of such discs, there could be a wider application for the use of rupture discs assemblies.

SUMMARY OF THE INVENTION

With the present invention, it has been found that by providing a rupture disc assembly having a support ring including a projection and a predetermined configuration for the continuous score line, in combination with a rupture disc, the disadvantages of using standard rupture discs with conventional support rings are overcome cost-wise and the combination of the present invention permits a wider range of application for varying liquid and gas usages, and varying burst pressures.

The present invention provides a rupture disc combination which permits the use of rupture disc members in association with a certain type of rupture disc assemblies which overcomes the disadvantages with rupture discs assemblies per se, and yet provides the advantages of certain features of known rupture discs.

It is therefore one aspect of the invention to provide in a rupture disc assembly having a support ring adapted to support a rupturable rupture disc member; said support ring including an aperture, an upper and lower surface and a continuous side surface, the improvement wherein the support ring includes contiguous cutting means about the inner peripheral wall, the cutting means comprising a plurality of adjacent arcuately contoured cutting means having an innermost surface of the arcuate contour spaced at a closer distance to said inner peripheral wall than outer ends of the arcuate contour.

In another aspect of the present invention there is provided in a rupture disc assembly having a support ring adapted to support a rupturable rupture disc member; the support ring including an aperture, an upper and lower surface and a continuous side surface, the improvement wherein the support ring includes engaging means for engaging a ruptured disc after rupture of the same, the engaging means comprising a projection extending upwardly from one of the surfaces of the support ring and extending inwardly of the surface over the aperture to thereby engage a displaced ruptured disc.

In another aspect of the present invention there is provided in a rupture disc assembly having a support ring adapted to support a rupturable rupture disc member, the support ring including an aperture, an upper and lower surface and a continuous side surface, the improvement wherein the support ring includes a contiguous cutting surface operatively associated with said projection, the cutting surface positioned on said inner peripheral portion on the support ring, the projection of the cutting surface having a generally clover-leaf configuration.

In various alternative embodiments, the device according to any of the above aspect, the disc further includes a dome having a pre-determined transition radius between the dome and the support ring.

In various alternative embodiments, the support ring includes a transition radius substantially corresponding to that of the disc.

In alternative versions, the support ring transition radius includes a diameter of the transition radius being smaller than the transition radius of the disc.

Desirably, in accordance with the present invention, there is provided in a rupture disc having a rupturable rupture member together with a support system including a support ring associated with the rupture disc, the support ring having a projection formed within the ring adapted to retain post burst disc material, the improvement wherein the rupture disc supporting ring comprises a predetermined continuous score line therein adapted to cut the rupture disc when the disc buckles at a predetermined pressure, the support ring with the continuous cut or score line being in operative association with the projection formed in the support ring.

It is therefore another aspect of the present invention to provide a bursting disc in combination with a support ring having a projection formed on one side of the ring in combination with a continuous score pattern is of a generally clover-leaf configuration.

DETAILED DESCRIPTION OF THE PREFERRED EMBODIMENT

Figure 1:
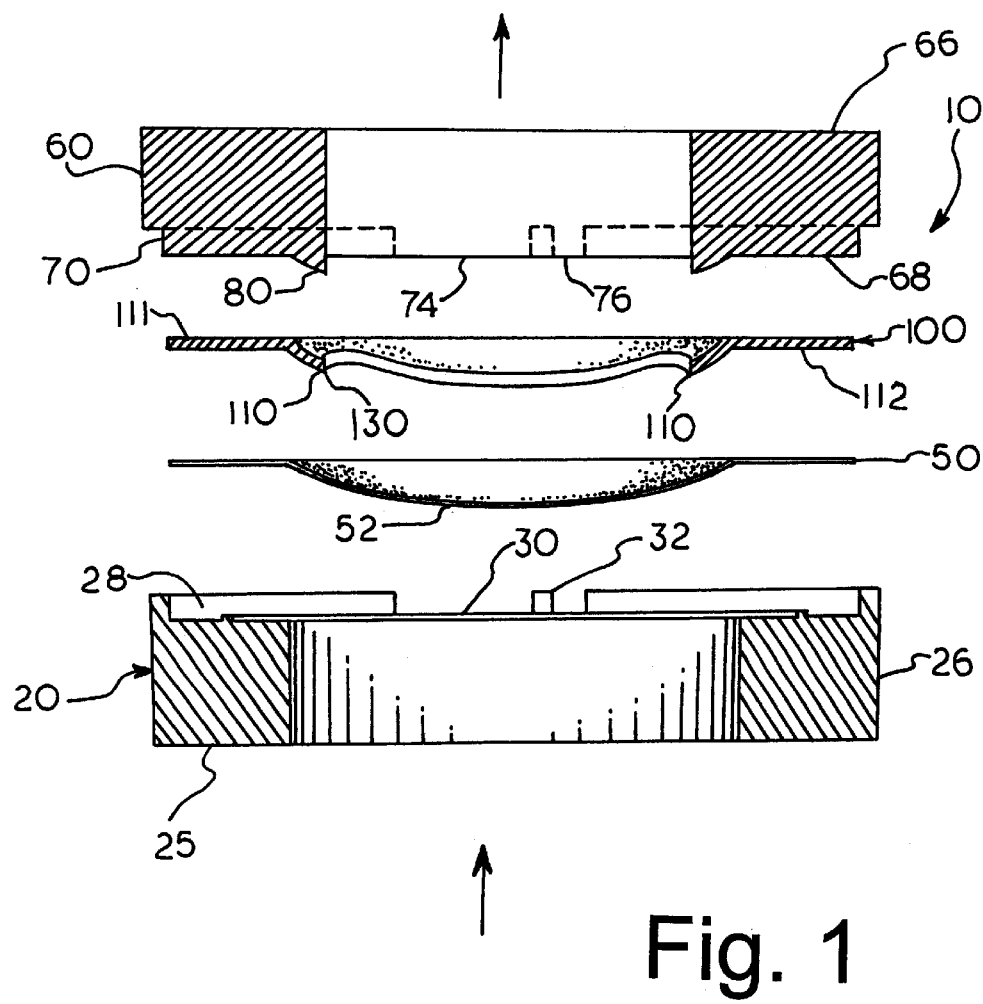
FIG. 1 is an exploded cross-sectional view of a bursting disc assembly.
Figure 5:
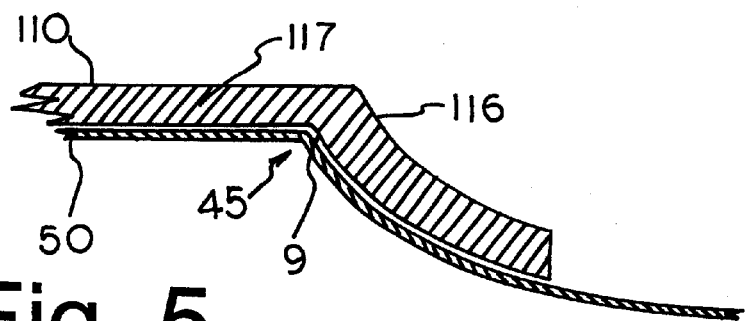
FIG. 5 is a enlarged view of the portion in circle A of FIG. 4.

For purposes of description herein the terms upper, lower, vertical and horizontal along with other directional references shall be relative to the invention as oriented in FIGS. 1 and 5, as illustrated in a pressure to non-pressure flow direction. It should also be understood that the various disclosed embodiments are merely exemplary and are utilized in a manner as would be readily understood by a person in the art.

The assembly as generally indicated by reference numeral 10, designates a rupture disc assembly including, in a pressure to non-pressure direction sequential relationship, a lower support holder or flange 20, a rupture disc 50, a support ring 100 and an upper support holder or flange 60. The assembly 10 when in use is securely held in an assembled condition through any conventional means, such as through the use of bolts or other mounting arrangements. The support structure 100 includes a projection or tongue member 120 formed in one side of the ring 100, and a continuous cutting surface 130 formed in the remaining non-projection sides of the ring (see FIG. 3).

The assembly 10 may be positioned within a safety release structure (not shown), such as a vent or pressure release valve assembly, and is normally adapted to prevent the flow of a liquid or a gas, in high and/or low pressures, through the assembly under a normal or predetermined burst pressure. The disc 50 is adapted to rupture or provide relief for excessive pressure when the predetermined maximum burst pressure of a bursting disc is exceeded.

When viewed from a pressure side to the non-pressure side of the device 10, there is provided a lower support holder or flange 20, which is positioned adjacent the lower surface of a bursting disc 50. The lower support holder or flange 20 may be constructed of any suitable material known in the art. The support holder or flange 20 in use is adapted to provide a secure seal against leakage between the disc 50 and the portion of the pressure vessel into which the assembly 10 is placed.

Figure 6:
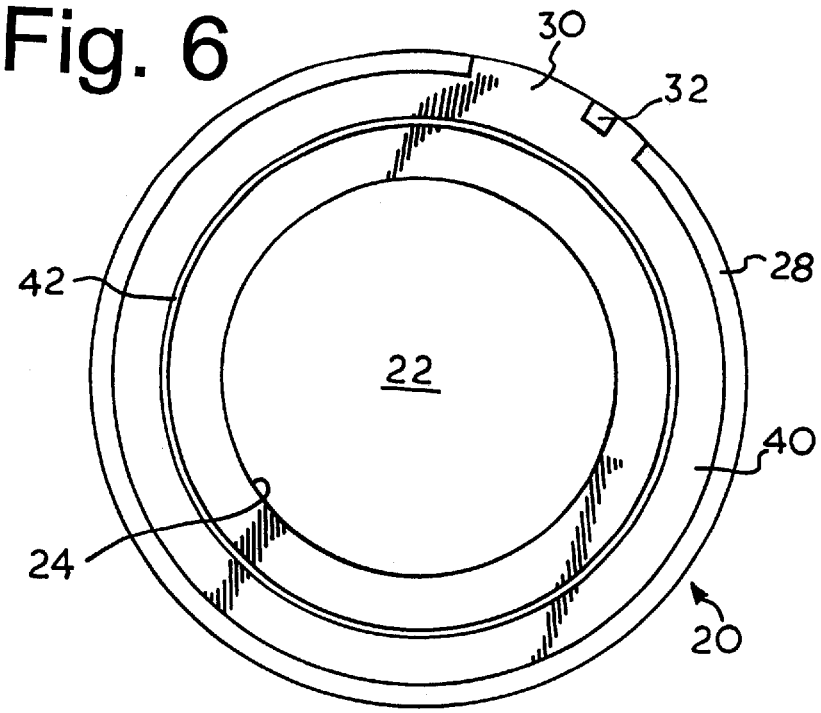
FIG. 6 is a top view of the lower holder.
Figure 7:
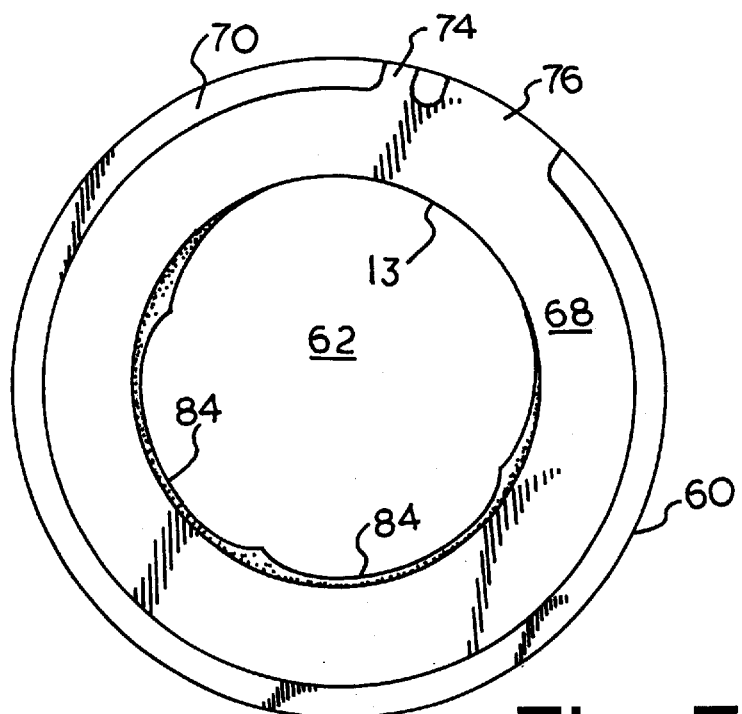
FIG. 7 is a view of the upper holder viewed from below.

As illustrated in FIG. 6, the lower support holder or flange 20 is of a generally circular or ring configuration, having a centralized aperture or bore 22, an inner peripheral wall 24 and an outer circumferential wall 26, a lower surface 25 (FIG. 1) and an upper annular surface or inner seating surface 40 around the centralized aperture 22 of the flange 20. In a preferred embodiment, the outer wall portion 26 of the lower holder or flange 20 extends above and around the annular surface 40, having a generally extending peripheral outer rim portion 28. Formed within the surface 40, through any conventional means such as milling, die forming, tooling or the like, is a circumferential raised projection or member 42, spaced inwardly of the outer rim wall 28. Raised member or projection 42 is adapted to provide a protuberance against which disc 50 abuts. When the assembly 10 is in a fully assembled condition, the raised projection or member 43 is adapted to securely retain the disc 50 against the support ring 110 and the support holder 20. As the assembly 10 is assembled and secured through conventional means, the pressure between the flange portion of the disc and the raised projection or member 42 allows for the flange portion to form or bend onto the projection thereby providing a seal and retaining the disc 50 in place.

In a preferred embodiment, the outer ring 28 is interrupted and provided with a gap portion or interruption 30. Most preferably the gap portion 30 is provided or interrupted by a segment 32 of the outer rim or wall portion, wherein the segment or segments are adapted to match or fit with a corresponding or mating portion on a subsequent element of the assembly. In a preferred embodiment, the raised projection or member 32 is spaced midway between the outer rim and the inner ring wall 24.

Figure 3:
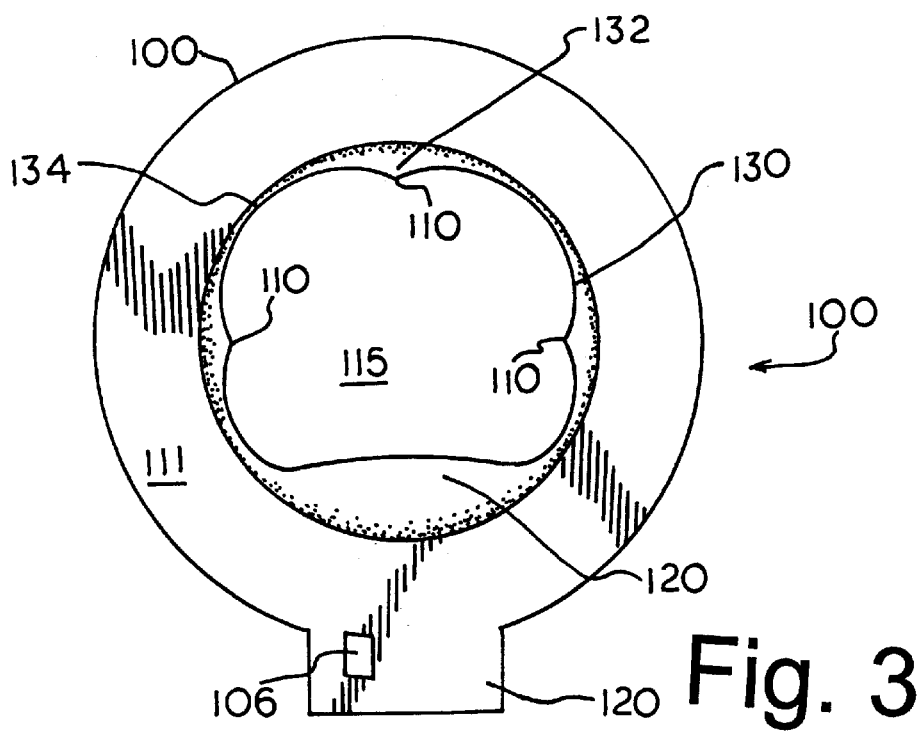
FIG. 3 is a top view of a support ring.
Figure 4:
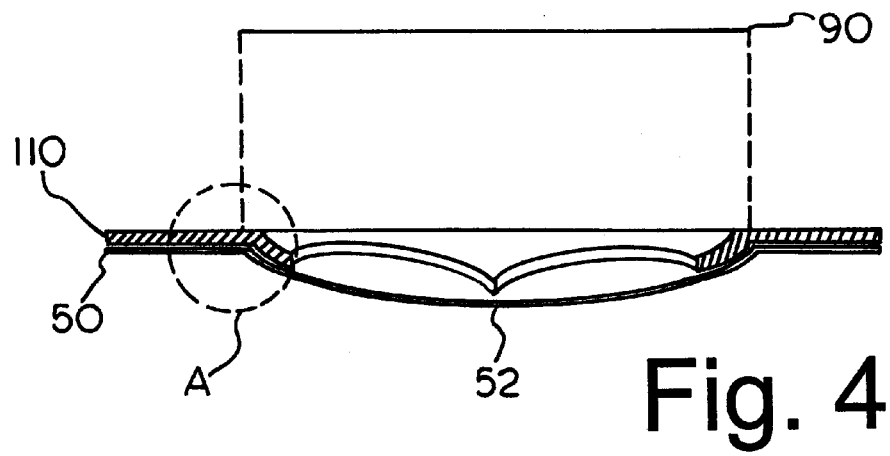
FIG. 4 is a cross-section view of the disc and support ring illustrating the transition diameter.

As illustrated in FIGS. 1 and 3, the support ring 100 handle portion 120. The support ring 100 is of a generally circular configuration, having an upper surface 111 and a lower surface 112, the ring being adapted through dimension and position to fit snugly within the assembly 10 as shown in FIGS. 1, 4 and 5. The support ring 100 further includes a central aperture 115, corresponding to that of the disc and flanges 20 and 60. The support ring has an inner peripheral edge 116 and an outer circumferential edge 117. The inner peripheral edge 116 includes a projection or hinge member 120, a series of downward projections 110, and an opening pattern or cutting edge 130 extend either side of the projections 110. The projection or hinge member 120 is formed at a predetermined point along the inner ring surface, the remaining portion providing the opening pattern or cutting edge 130. The cutting edge 130 has a generally continuous configuration, which according to the present embodiment is of a generally clover leaf pattern.

As shown in FIG. 1, the projections 110 and the cutting edge 130, and projections 110 of the support ring 100, when viewed from a pressure side to a non-pressure side perspective, depend or otherwise extend downwardly below the horizontal axis of the supporting ring 100. As shown in an assembled state, the cutting edge 130 and projection 120 depend into the concavity of the dome portion of the disc 50, wherein the transition radius and diameter is substantially similar to that of the disc. The support ring 100, including inner peripheral edge 125 and outer peripheral edge 126, has a predetermined transition radius and transition diameter, discussed in detail below.

Figure 2:
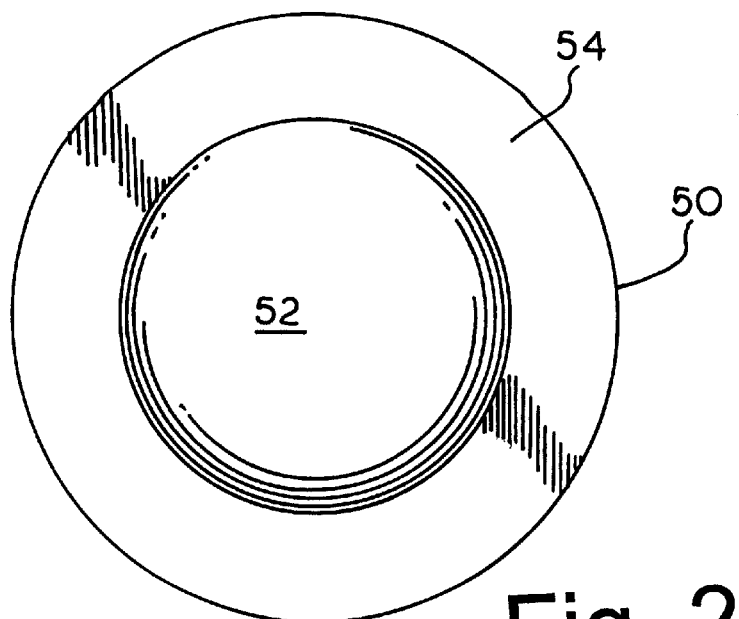
FIG. 2 is a top view of a rupture disc.

The opening pattern or cutting edge 130 in the example shown in FIG. 2, is of a generally clover leaf configuration, extending continuously along an inner peripheral portion 116 of the supporting ring 100 Most desirably, the cutting member 130 having a generally clover leaf configuration depends from the horizontal plane of the support ring 100 towards and within the dome portion of the disc 50. The cutting edge 130 includes the tear initiation points 110, and arcuately curved continuous cutting portions 134, the cutting edge has an angle generally being between 50 and 70 degrees, and most desirably about 60 degrees. The arcuately curved cutting portions 134 include inner arcs which substantially coincide with the bore of an upper support holder 60.

This provides for a non-fragmenting burst pattern of the disc, although other suitable angles may be used. A method of forming this cutting pattern is described in further detail below.

As shown in FIG. 3, the outer circumferential edge of the support ring 100 includes the projection 120. Formed within the projection 120 through any conventional means is a slot or aperture 106, adapted to aid in the proper assembling of the assembly 10 by being able to receive member 32, on the lower holding member 20.

As illustrated in FIGS. 1 and 2, the disc 50 is of a conventional type commonly referred to as a reverse buckling disc, fabricated from a conventional metal material such as steel, steel alloy or other, and is adapted to tear upon reversing along the predetermined cutting pattern 130 on the support ring 110 when a pressure load exceeds the predetermined pressure load of the rupture disc 50. The rupture disc 50 includes a central portion or dome portion 52, and a flange or rim portion 54, and is adapted to be positioned with the dome 52 facing in a pressure flow direction between the support structure 100 and the lower flange 20. Disc 50, when in use and under excessive pressure, is adapted to reverse buckle towards the support ring 110 and the projection member 120. The dome portion 52 of the disc 50 is cut or otherwise opened against the clover leaf pattern immediately after which the burst or buckled disc is wrapped around the projection 120.

Disc 50 may be of any conventional type, such as a non-scored reverse bursting disc. When utilized in accordance with the present invention, no score lines are required as the support ring 110 as described in detail below includes a cutting formation which provides for the serration and non-fragmentation of the disc 50. According to a preferred embodiment, when using a non-scored reverse buckling disc, the present invention is able to be utilized within both gaseous and liquid environments, and for both high and low burst pressures in both gaseous and liquid environments.

Most preferably, the disc 50 includes a transition region 45 having a predetermined transition radius and diameter. The transition radius between the dome portion of the rupture disc and the peripheral portion is approximately identical in both the rupture disc and the support ring. Desirably, the diameter of the transition radius of the support ring is approximately 0.010" to 0.020" smaller than the transition radius of the disc.

As illustrated in FIGS. 4 and 5, the transition diameter and radius of the support ring and the disc, as indicated above, are substantially similar, with the support ring being adapted through dimension and position to coincide with the disc 50. The transition diameter of the support ring 110, as generally indicated by reference numeral 90, has a predetermined diameter and radius corresponding to that of disc 50. This ratios of course will vary depending upon the size and diameter of the disc being used, as will be understood by one skilled in the art.

Figure 8:
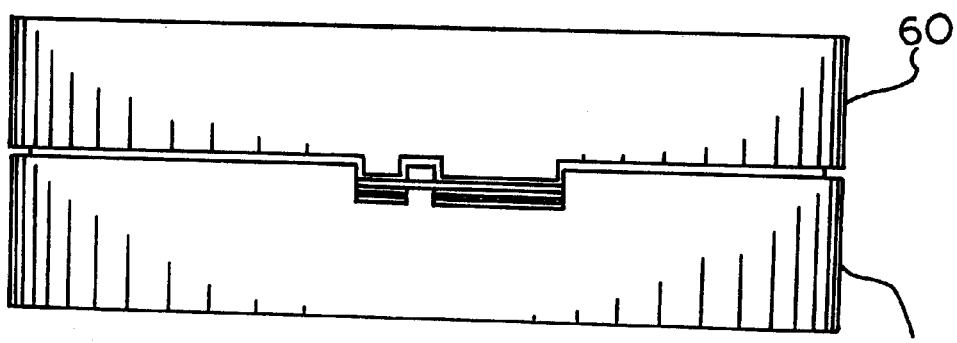
FIG. 8 is a side view of the assembled device.

A second upper holder or flange 60 is positioned abutting the support ring 100, as shown in FIGS. 1 and 8, on the non-pressure side of the disc 50. The upper support holder or flange 60 is adapted to provide a secure seal against leakage between the non-burst disc 50 and the non-pressure side of the assembly 10 when placed within a pressure vessel. The upper support holder 60 is similar to that of the lower support holder or flange 20, wherein the upper or non-pressure side support holder or flange 60 has a generally cylindrical configuration including a central aperture 62, having a defined bore dimension, a continuous side wall 64 and upper and lower surfaces 66 and 68, respectively. The upper support holder 60 includes a corresponding or mating portion 70 having a circumferential or annular seat to that of the outer rim of flange 20. Alternatively, the mating portion 70 of the upper support holder 60 is interrupted by spaced apart projections 74 and 76, extending from the side wall 64. Projections 74 and 76 are dimensioned to correspond with the gap portions 30 and 32 of the outer rim 28. The corresponding projections of the upper support holder 60 aid in the proper seating and assembly of the ring assembly 10 by ensuring that the gap portions and projections are mated correctly in an abutting relationship. If the upper and lower support holders 20 and 60 are not properly fitted together, they will not properly align, and the assembly would not be able to be assembled in the relationship illustrated in FIG. 1.

Desirably, as shown in FIG. 1, the bore of the upper support holder 60 is provided with depending projections 80 adapted to support the cutting member 130. Depending support 80 include corresponding support projections 82 adapted to aid in supporting the support ring cutting or tear initiation points 110. Depending support 80 includes arcuately curved sections 84 adapted to reinforce or support arcuately curved members 134. The depending support 80, aids in supporting the cutting member 130 when the predetermined burst pressure of a reverse rupture disc has been exceeded and the disc reverses and is cut open on the tear initiating members 110 and the cutting edge 130. Typically, this pressure is substantial and the bursting of the disc 50 is quite rapid and places pressure upon the support ring cutting member. As such it is desirable to support the cutting pattern in such a way that substantially all of the cutting surfaces are supported against undesirable bending or twisting during the serration or cutting of the disc 50. Most preferably the projections have the substantially similar transition radius and transition diameter to that of the support ring and rupture disc. By having the innermost segments of the contoured configurations coincide with the defined bore of the upper support holder, the present invention enables a bursting disk to be applicable for both gas and liquid applications and for high and low pressure applications.

In use, the assembly 10 is clamped in a pressure line (not shown). The lower support holder or flange 20 is placed toward the pressure flow, followed in an abutting and sealed sequential relationship, a reverse buckling disc 50, a support ring 100 and an upper support holder or flange 60, positioned such that any pressure must first contact the disc 50. When pressure in the vessel is greater than the rupture pressure of the rupture disc 50, the disc reverse disc pressure load is exceeded and upon rupture, the pressure is relieved through the assembly 10.

As the reverse buckling disc 50 reverses upon itself, the dome or concave convex portion of the disc is forced against the cutting edge pattern 130 of the support ring 110. The cutting pattern 130 effectively cuts the disc 50 along the continuous cutting edge such that the cutaway portion of the disc folds or hinges along the projection member 120.

In a further alternative embodiment, the upper support holder or flange 60 includes a depending projection, having a substantially similar configuration to that of the cutting pattern of the support ring 110. This depending projection provides for additional support of the cutting member 130 during the bursting of the disc 50.

Desirably, a method for forming the support ring includes providing a blank for use as a support ring is manufactured through conventional means, ie pressing, cutting etc., resulting in a bulged out or domed shape configuration. Ideally, once formed, the disc 50 includes a flange portion, and a concave/convex dome, and a pre-determined transition region having a transition radius and transition diameter substantially equal to that of a corresponding disc member. As understood, the term transition radius used herein is used to describe the area between the flange portion of the disc and the dome portion of the disc having a predetermined radius and angle. The transition diameter is understood to describe the length of the area between the flange sides.

In a preferred embodiment, the transition diameter of the support ring 110 has a predetermined length alpha, which is substantially similar to that of the of the transition diameter beta of the disc 50. The substantially similar transition diameters provide for a closer or more snug fit between the disc 50 and the support ring 110 which allows for less movement of the disc upon burst and aids in the efficient cutting of the disc 50 upon the tear initiation points or cutting points 132 and arcuate cutting members 134.

A preferred method of forming the cutting pattern 130 of the support ring 110 is utilizing a precision cutting means, such as a laser, to effectively cut or otherwise form the clover leaf cutting pattern 130 in the pre-formed blank. This provides for a more precise cutting of the support ring surface, as the laser optimally cuts at a 90 degree angle to the ring surface. The laser provides (or forms) a cutting edge having a predetermined angle extending for at least a major portion of the pattern. As stated, the cutting edge has a predetermined angle of between 50 and 70 degrees, and most preferably has a cutting angle of approximately 60 degrees.

Although embodiments of the invention have been described above, it is not limited thereto and it will be apparent to those skilled in the art that numerous modifications form part of the present invention insofar as they do not depart from the spirit, nature and scope of the claimed and described invention.

What is claimed is:

1. In a rupture disc assembly having a support ring adapted to support a rupturable rupture disc member, said support ring including an aperture, spaced upper and lower surfaces, a continuous side surface, an inner peripheral wall and at least one tear-initiation projection, the improvement wherein said support ring includes contiguous cutting means about said aperture, said cutting means comprising a plurality of arcuately contoured segments having an innermost arc portion some portions of the arcuate segments spaced closer to said inner peripheral wall than other portions of the arcuate segments.

2. A rupture disc support ring comprising:
   a substantially flat support ring having a pair of opposed planar surfaces and a central aperture extending between said surfaces encircled by said ring;
   at least one tear-initiation projection for initiating a tear in a reverse buckling disc, said projection extending from said planar support ring inwardly into said aperture and projecting downwardly and below one of said opposed surfaces; and
   arcuately contoured cutting means at least partially surrounding said aperture and extending either side of said tear-initiation projection, said cutting means having an innermost segment of the arcuately contoured cutting means abutting said support ring and projecting downwardly from said one of said opposed surfaces.

3. The apparatus of claim 1, wherein said support ring includes means to prevent fragmentation of a reverse buckling disc when said disc is ruptured.

4. The apparatus of claim 3, wherein said means comprises an inwardly extending tab associated with said support ring.

5. The apparatus of any one of claim 1, wherein said support ring is in combination with a reverse buckling rupture disc, said rupture disc comprising a dome-shaped central member surrounded by a substantially planar annular flange, said rupture disc having a transition radius between said flange and said dome-shaped member.

6. The apparatus of claim 5, wherein said support ring includes a transition radius between one of said planar surfaces and the downwardly and inwardly extending tear initiation projection, said transition radius of said support ring being substantially the same as the transition radius of said reverse buckling rupture disc.

7. The apparatus of claim 5, wherein said support ring includes a transition diameter between one of said planar surfaces and the downwardly and inwardly extending tear initiation projection, said transition diameter of said support ring being substantially the same as the transition diameter of said reverse buckling rupture disc.

8. The apparatus of claim 4, said apparatus including cooperating first and second holding means for mounting said support ring and said reverse buckling rupture disc, said first and second holding means having a central aperture, and means for retaining said first and second holding means within operative relationship with said support ring and said rupture disc.

9. The apparatus of claim 8, wherein one of said holding means includes an aperture having a configuration corresponding substantially to the aperture configuration of said support ring.

10. The apparatus of claim 9, wherein said holding means includes a plurality of support means for supporting said plurality of spaced-apart tear initiation projection of said support ring.

11. The apparatus of claim 10, wherein said holding means has a plurality of arcuately contoured sides of said aperture extending between opposed surfaces of said holding means, said arcuately contoured sides corresponding in shape to the arcuately contoured configuration of said cutting means of said support ring.

12. The apparatus of any one of claim 6, wherein at least one of said holding means includes positioning means for positioning said support ring in a predetermined direction between said holding means.

13. The apparatus of claim 12, wherein said positioning means comprises a projection extending from one of said holding means, the other of said holding means having a recess adapted to receive said projection, and said support ring having means for receiving said projection and positioning said support ring between said holding means.

14. For use with an upper holding member having a bore and a lower annular surface;
   a rupture disc and support member assembly comprising a rupture disc having an annular peripheral section and a domed central section extending downwardly from said upper holding member, and a support member having an annular peripheral section resting on said annular peripheral section of said rupture disk and at least one cutting projection extending downwardly from said peripheral section, in close proximity to said domed section for initiating tear in said domed section, and arcuately contoured cutting edges extending each side of said cutting projection, said cutting edges each including an inner arc section coincidental with said upper holding member when said upper holding member is positioned on an upper surface of said peripheral section of said support member.

15. An assembly as claimed in claim 14, including a plurality of spaced cutting projections.

16. An assembly as claimed in claim 14, including a cord section on an inner periphery at the annular peripheral section of the support member, said cord section forming a hinge member.

17. A bursting disc assembly including a reverse buckling bursting disc comprising:
   a lower tubular holding member having a bore and spaced apart annular seating surfaces, an upper surface and a lower surface;
   a reverse buckling bursting disc having a peripheral annular section seated on the upper surface of the lower holding member and a domed central section extending down into the bore of the lower holding member;
   a support member having a peripheral annular section seated on said annular section of the bursting disc and at least one tear initiating member extending downwardly within said domed portion and in close proximity thereto, and arcuately contoured cutting edges extending on each side of the said tear initiating member;

an upper tubular holding member having a bore and spaced apart annular seating surfaces, an upper surface and a lower surface, the lower surface seated on said peripheral annular section of said support member; and said contoured cutting edges including innermost arc sections coinciding with the bore of the upper holding member.

18. An assembly as claimed in claim 17, including a plurality of space tear initiating members.

19. An assembly as claimed in claim 17, including a chord section, on an inner periphery of the annular peripheral section of the support member, said chord section forming a hinge member.

20. An assembly as claimed in claim 17, including support formations extending down from said upper holding member to support said tear initiating member or members.

21. In a support holder adapted for use with a rupture disc assembly in which the assembly includes a lower holder, an upper holder, and a rupture disc, the improvement wherein at least one of said holders has a central aperture having an inner continuous peripheral wall with a plurality of contiguous arc portions extending inwardly of said aperture for support the peripheral edges of a support ring for a rupture disc.

22. A support holder comprising an upper and a lower surface, a central aperture having an inner peripheral wall, said aperture having a cloverleaf-shaped configuration in transverse cross section, said holder having, on at least one of said upper and lower surfaces, projections extending beyond one of said upper or lower surfaces, said projections having a contour forming said cloverleaf shaped configuration, said projections supporting a support ring for a rupture disc.

23. A support holder as defined in claim 22, said support holder including first and second holder members forming a holder assembly to mount a support ring and a rupture disc there-between, said first holder member including an upper and a lower surface, an outer circumferential wall, and a central aperture having an inner peripheral wall; said second holder member including an upper and a lower surface; an outer circumferential wall and a central aperture having an inner peripheral wall, wherein said aperture of said first or second holder member has a plurality of contiguous arc-shaped outlines extending inwardly of said aperture, and a plurality of projections extending from one of said surfaces corresponding to an apex of said arc-shaped projections.

24. A support holder assembly as defined in claim 23, wherein each of said holder members further includes a cooperating mating portion to permit said first and second holders to releasably engage eat other.

25. A support holder assembly as defined in claim 24, wherein one of said mating portions includes spaced-apart protections extending from an upper surface of a side wall, said projections being dimensioned to correspond with gap portions of a corresponding portion on said other holder member.

26. The support holder of claim 23, wherein said holders include a support ring.

27. The support holder of claim 23, wherein at least one of said holding members includes positioning means for positioning said support ring in a predetermined direction between said holding means.

28. The support holder of claim 27, wherein said positioning means comprises a projection extending from one of said holding means, the other of said holding means having a recess adapted to receive said projection, and said support ring having means for receiving said projection and to position said support ring between said holding means.

\* \* \* \* \*